UNITED STATES PATENT OFFICE.

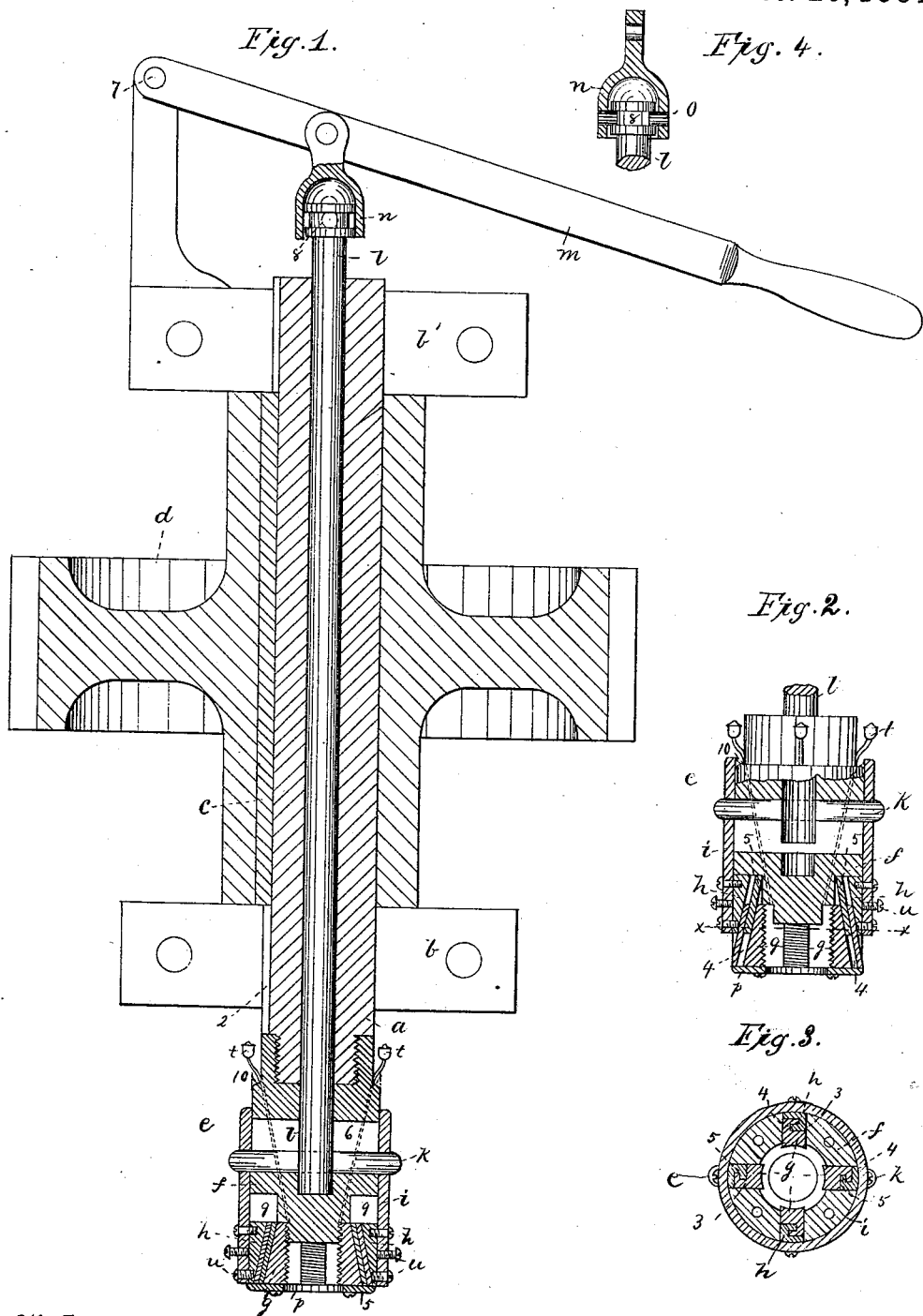

CALEB C. WALWORTH, OF BOSTON, MASSACHUSETTS.

DEVICE FOR CUTTING SCREW-THREADS.

SPECIFICATION forming part of Letters Patent No. 251,080, dated December 20, 1881.

Application filed April 1, 1881. (No model.)

*To all whom it may concern:*

Be it known that I, CALEB C. WALWORTH, of Boston, Suffolk county, State of Massachusetts, have invented an Improvement in Dies for Cutting Screw-Threads, of which the following description, in connection with the accompanying drawings, is a specification.

My invention relating to a screw-cutting tool is shown embodied in a die or instrument for cutting external threads, as upon screws, bolts, nippers, &c., and has for its object to enable the thread-cutters to be disengaged by a lateral movement from the threads cut thereby, so that after a thread is cut the die may be disengaged therefrom and withdrawn by a single longitudinal movement, instead of having to be unscrewed or removed by a reversed rotary movement to that by which the thread was cut.

The invention consists, mainly, in the combination, with the cutters, by which the threads are to be chased, mounted movably in a suitable cutter-head, of a cutter-operating device, whereby the said cutters may be moved toward the axis of the said cutter-head and rigidly held in proper position while the thread is being cut, and whereby, after the thread has thus been cut, the cutters may be moved outward from the said axis a distance greater than the depth of the screw-threads, so that the said cutters are wholly disengaged from the said threads, and may be removed by a longitudinal movement independent of its rotary movement, which may be stopped or may continue in the same direction as that by which the thread was cut. The cutters are mounted in radial slots in the cutter-head, with their cutting-edges, of usual character, facing the axis thereof, and have their rear or outward faces inclined to the axis of the cutter-head. A sleeve or collar surrounds the said cutter-head, it being free to move longitudinally thereon, and is provided with cutter-operating wedges engaging the inclined rear surface of the said cutters, so that a longitudinal movement of the sleeve and its connected wedges relative to the cutter-head and its cutters will produce the radial movement of the latter into engagement with the material to be cut, or out of engagement with the threads cut therein, as the case may be. The wedges are interlocked with or dovetailed into the cutters, so as to cause the said cutters to be retracted with the said wedges, as well as forced into engagement with the material to be cut.

The sleeve is herein shown as moved longitudinally to operate the cutters by a rod passing axially through the die-spindle and terminating in the cutter-head, where it is connected by a pin with the cutter-operating sleeve, the said pin passing diametrically through a slot in the cutter-head. This slot is long enough to give the connected rod and sleeve a sufficient movement to throw the cutters the desired distance, after which the pin engages the cutter-head at the end of the slot, causing the whole die and its spindle to move with the cutter-operating rod in its further movement, in which the die is fed into the material being cut, or is withdrawn therefrom, as the case may be. The die-spindle is movable longitudinally in its bearings for feeding and withdrawing, it being splined to connect it with its driving pulley or gear, and having greater friction therein, to resist longitudinal movement, than the cutter-operating rod has in the said spindle, so that when a force is applied to the former it is first moved in the spindle until the pin connecting it with the cutter-operating sleeve arrives at the end of the slot, after which the die and its spindle are caused to move positively with it. The said rod has connected with it a handled lever, by which the operator moves it forward and back longitudinally, to throw in the cutters, and then feed the die in its forward movement, and to throw out or disengage the cutters from the cut thread and withdraw the die in its backward movement.

The cutter-operating wedges are adjustably connected with their operating-sleeve, as by set-screws, to enable them to set the cutter at the proper distance from the axis of the die-spindle, they being moved in toward the axis as the cutters wear away.

Figure 1 is a vertical longitudinal section of a die and its operating mechanism constructed in accordance with my invention, the cutters being shown as in position to act on the artidie to be threaded; Fig. 2, a similar sectional view of the die with the cutters thrown out to disengage the material that has been threaded by them to permit the die to be withdrawn without unscrewing or rotating in reverse direction; Fig. 3, a transverse section of the die on dotted line $xx$, Fig. 2; and Fig. 4, a detail showing the connection between the cutter-operating rod and its actuating handled lever.

The main die-spindle $a$, supported in suitable bearings, $b$ $b'$, is provided with a spline or groove, 2, to receive a feather, $c$, fixed in a corresponding groove in the driving-gear $d$, mounted on the said spindle $a$, between the bearings $b$ $b'$. The spindle $a$ is thus caused to rotate with the gear $d$, but may have an independent longitudinal movement therethrough, and it carries at its end the die $e$, shown as screwed thereon, and consisting of a cutter-head, $f$, provided with radial slots or passages 3, (see Fig. 3,) in which the cutters $g$ have a limited sliding radial movement somewhat greater than the depth of the threads cut by them. The said cutters $g$ are inclined at their rear sides to the axis of the cutter-head and its spindle, and each is provided with a groove, 4, to receive a wing, 5, on the cutter-operating wedge $h$, fixed upon the inside of a sleeve or collar, $i$, fitted upon the outside of the cutter-head $f$, and connected by a pin, $k$, with the cutter-operating rod $l$, passing axially through the middle of the die-spindle $a$.

The pin $k$ passes through a slot, 6, in the cutter-head $f$, of such length, measured along the axis, as to permit a longitudinal movement of the rod $l$ and connected sleeve $i$ and wedges $h$ relative to the spindle $a$ and connected cutter-head $f$ and cutters $g$, and, owing to the inclination of the engaging surfaces of the cutters $g$ and their operating-wedges $h$, this longitudinal movement produces a radial movement in the said cutters. The rod $l$ is actuated by a handled lever, $m$, pivoted at 7, and provided with a cap, $n$, pivoted thereon and inclosing the end of the rod $l$, the said cap being provided with pins $o$ to enter an annular groove, 8, at the end of the said rod $l$, thus permitting the rotary movement of the rod, but causing it to be moved longitudinally as the lever $m$ is turned on the pivot. When the pin $k$ arrives at the end of the slot 6, in the forward movement of the rod $l$ to the position shown in Fig. 1, it engages the cutter-head $f$, causing it and the connected spindle $a$ to move forward, in connection with the said rod $l$ and other parts, as the thread is cut. When the thread is completed the rod $l$ is moved back by the lever $m$ from the position shown in Fig. 1 to that shown in Fig. 2, it at first moving independently of the spindle $a$ and cutter-head $f$, and thus throwing the cutters radially outward, as shown in Fig. 2, until after the pin $k$ has traversed the slot 6, it engages the cutter-head $f$, and in the further movement of the said rod it carries the spindle $a$ and connected die $e$ back from the material, which has been threaded, and which may have been held in any usual manner, as by a vise or clamp.

The spindle $a$ is made to offer a greater resistance to longitudinal movement in its bearing in the driving-gear $d$ than the resistance of the rod $l$ to movement in the said spindle $a$, so that when the lever $m$ is moved in either direction the rod $l$ will be moved independently of the spindle $a$ until the pin $k$ has traversed the length of the slot 6. These longitudinal movements of the rod and spindle and the radial movements of cutters actuated thereby are entirely independent of the rotary movement caused by the driving-gear $d$, which may continue running constantly in the proper direction to cut the threads.

The cutter-head $f$ is recessed, as shown at 9, to receive the wedges $h$ when drawn back to the position shown in Fig. 2. An annular face-plate, $p$, fastened to the end of the cutter-head $f$, retains the cutters $g$ in place in their slots.

When the sleeve $i$ and cutter-operating wedges $h$ are thrown forward, as shown in Fig. 1, and the cutters $g$ are in operative position, the said sleeve and wedges form a firm and rigid support for the said cutters throughout their entire length.

Oil-passages are formed in the cutter-head $e$, leading from the neck thereof at 10 on the outside to the cutting-edges of the cutters $g$, and when the spindle $a$ is to be operated in a vertical position the neck of the cutter-head may be provided with an annular channel or groove, as shown in dotted lines at 10, to receive the oil; or oil-cup $t$, of any usual construction, may be employed.

The wedges $h$ are connected with the sleeve $i$ by set-screws $u$, to enable them to be adjusted toward and from the axis of the cutter-head, so that the cutting-edges of the cutters $g$ may be brought in proper position as the said cutters are worn away.

I claim—

1. The cutter-head and movable cutters therein, combined with the sleeve surrounding the said head and the independent cutter-operating wedges connected therewith, substantially as described.

2. The die-spindle and cutter-head and its movable cutters therein, combined with the cutter-operating sleeve and wedges, and the actuating-rod positively connected with the said sleeve, it passing axially through the said spindle and having an independent longitudinal movement therein, substantially as and for the purpose described.

3. The die-spindle and the cutter-head thereon, provided with a transverse slot, and with cutter-receiving slots and cutters movable therein, combined with the cutter-operating sleeve surrounding the cutter-head and provided with wedges, and its actuating-rod passing through the die-spindle, and the pin connecting the said rod and sleeve and passing through the slot in the cutter-head, substantially as and for the purpose described.

4. The cutter-head and cutters movable therein, combined with the cutter-operating wedges and their actuating-sleeve, adjustably connected therewith, substantially as described.

In testimony whereof I h.ve signed my name to this specification in the presence of two subscribing witnesses.

CALEB C. WALWORTH.

Witnesses:
 Jos. P. LIVERMORE,
 L. F. CONNOR.